United States Patent

Elton et al.

[11] Patent Number: 5,360,701
[45] Date of Patent: Nov. 1, 1994

[54] ANTISTATIC BACKING FOR PHOTOGRAPHIC ROLL FILM

[75] Inventors: Peter J. Elton; John C. Clarke; John L. Cawse; George Littler, all of Cheshire; Andrew Wigglesworth; Peter J. Herring, both of Bucks, all of England

[73] Assignee: Ilford Limited, Mobberley, England

[21] Appl. No.: 49,605

[22] Filed: Apr. 19, 1993

Related U.S. Application Data

[63] Continuation of Ser. No. 811,846, Dec. 23, 1991, abandoned.

Foreign Application Priority Data

Jan. 5, 1991 [GB] United Kingdom .............. 9100194.1

[51] Int. Cl.$^5$ .................... G03C 3/02; G03C 3/00; G03C 1/775; G03C 1/95
[52] U.S. Cl. .................... 430/501; 430/496; 430/527; 430/531; 430/533; 430/538
[58] Field of Search .............. 430/533, 527, 501, 531, 430/538, 937, 496; 252/501.1, 502, 511; 428/408; 423/449.1

[56] References Cited

U.S. PATENT DOCUMENTS

| | | | |
|---|---|---|---|
| 4,301,239 | 11/1981 | Miller | 430/527 |
| 4,312,937 | 1/1982 | Kasper et al. | 430/527 |
| 4,476,153 | 10/1984 | Kiritani et al. | 430/532 |
| 4,701,359 | 10/1987 | Akao | 428/35 |
| 4,702,860 | 10/1987 | Kinderov et al. | 252/502 |
| 4,705,746 | 11/1987 | Tamagawa et al. | 430/538 |
| 4,816,363 | 3/1989 | Naito et al. | 430/527 |
| 5,214,091 | 5/1993 | Tanaka et al. | 252/511 |

FOREIGN PATENT DOCUMENTS

| | | |
|---|---|---|
| 741377(A) | 4/1970 | Belgium . |
| 60-260041(A) | 12/1985 | Japan . |
| 2222700(A) | 3/1990 | United Kingdom . |

*Primary Examiner*—Charles L. Bowers, Jr.
*Assistant Examiner*—Mark F. Huff
*Attorney, Agent, or Firm*—Darby & Darby

[57] ABSTRACT

There is provided a roll film assembly which comprises a length of photographic film having attached to each end thereof a length of backing paper, the film and the backing paper being wound together on a flanged spool, the backing paper being a laminate of paper and polyethylene which comprises as an opaqueing agent a layer of polyethylene which comprises from 7 to 10% by weight of carbon black particles of which from 20 to 100% by weight are conductive carbon particles.

9 Claims, No Drawings

ANTISTATIC BACKING FOR PHOTOGRAPHIC ROLL FILM

This is a continuation of application Ser. No. 07/811,846, filed Dec. 23, 1991.now abandoned.

This invention relates to the preparation of backing paper for use in roll film assemblies.

Roll film backing paper, which is paper to which so called roll film is attached, the roll being wrapped on spools with flanged ends, used to be made of paper covered with a black paint on the side distal to the emulsion side and coloured paint on the emulsion side on which the frame number and other indicia were printed. However it was difficult to get such paper completely light-opaque and looking attractive. Thus in recent years roll-film backing paper has consisted of white paper on to which has been laminated a plastics material layer containing carbon-black particles. This solved the lack of opaqueness problem and had a more attractive appearance but it was found that during processing when the film was separated from the wrapper an electrostatic discharge sometimes occurred which caused the developed film to exhibit characteristic discharge marks. In order to alleviate this problem various attempts were made to reduce the high resistivity of the black pigmented plastic material layer on the backing paper. One method which has been tried but without much success is to treat the black pigmented layer with a sizing agent such as a composition which comprises bentonite or another silicaceous material.

We have found a way of reducing the high resistivity of a black pigmented plastics material layer in a roll film assembly.

Therefore according to the present invention there is provided a roll film assembly which comprises a length of photographic film having attached to each end thereof a length of backing paper, the film and the backing paper being wound together on a flanged spool, the backing paper being a laminate of paper and polyethylene which comprises as an opaqueing agent a layer of polyethylene which comprises from 7 to 10% by weight of carbon black particles of which from 20 to 100% by weight are conductive carbon particles.

Preferably from 30 to 80% by weight of the carbon black particles are conductive carbon particles.

Preferably the coating weight of the polyethylene layer on the paper base is between 1 and 20 g/m$^2$. This forms a layer on the paper base between 5 and 50 microns thick.

The polythene layer which comprises the conductive carbon particles may be a polyethene homopolymer or it may be a copolymer of ethylene and a copolymerisable monomer for example acrylic acid or vinyl acetate but the percentage by weight of ethylene units in such copolymer is at least 70%.

Carbon black particles are similar to graphite in chemical structure and in theory may therefore be potentially semi-conducting. However in practice many types of carbon black are not particularly conductive, and in fact the degree of electrical conductivity in a composite containing carbon black depends on several factors including the surface area of particles, the tendency for clusters of particles to form, and the nature of the particle surface.

For electrons to flow through a composite material in which the dispersed phase is conductive and the continuous phase is an insulator, there must exist a continuous path of conductive particles throughout the composite. This means that the individual particles must be capable of aggregating to form a network structure, provided the particles are present in the sufficient numbers and the conditions for the formation of the composite are not so vigorous that the pathways are broken up.

Carbon black particles may possess more or less "structure", a characteristic which is considered to be affected by porosity, specific surface area and aggregation tendency. The "structure" of carbon black particles depends on their method of manufacture and is often expressed in terms of the amount of dibutyl phthalate absorbed by the carbon black, with the higher structure blacks absorbing more phthalate.

Also depending upon the method of manufacture, the surface of the particles will have low molecular weight organic species absorbed thereon, and the presence of these volatile species has the effect lowering the conductivity.

When the degree of aggregation is large, the volatile content is low, and the specific surface area of the carbon black particles is high, the conductivity of the particles is also high and they are capable of imparting improved conductivity and hence improved charge dissipation properties to composites in which they are incorporated. It is still necessary, however to ensure that the particles are well dispersed within the composite, and that excessive shear forces are not used during formation of the composite, which could lead to the disruption of the conductive paths.

Thus the surface resistivity of a polymer composite which comprises ordinary carbon black at a loading rate of 10% by weight is greater than $10^{10}$ ohms/m$^2$ whilst the surface resistivity of a polymer composite which comprises conductive carbon particles at a loading rate of 10% is less than $10^9$ ohms/square. Further the charge decay rate, which is just as important as surface resistivity for a polymer composite which comprises ordinary carbon black, is greater than 100 seconds whilst the charge decay rate for composite which comprises conductive carbon at a loading rate of 10% by weight is less than about 4 seconds. The charge decay rate is here taken to mean the time taken for the charge to fall to a specified fraction of its original value, for example 1/e.

Thus a carbon black which when present in a polymer composite at a loading rate of 10% by weight decreases the surface resistivity to less than $10^9$ ohms/m$^2$ and which reduces the charge decay rate to less than 4 seconds is a conductive carbon.

However a subsidiary object of the present invention is to provide methods for enabling a polyethylene layer which comprises conductive carbon particles to be adhered to a paper base.

According to method 1 of this aspect of the present invention there is provided a method of preparing a laminate which comprises a paper base having coated thereon a layer of polyethylene which comprises conductive carbon particles which method comprises providing in or on the surface of the paper base a polyethylene emulsion or a polyethylene copolymer emulsion and applying to that surface of the paper base a layer of polyethylene comprising conductive carbon particles at such a temperature that the particles of the polyethylene in the emulsion become molten.

The polyethylene emulsions of use in this aspect of the present invention are widely available and are used as floor waxes and printing ink bases, as well as moisture—proof coatings for paper. The polyethylene emulsions are also known as polyethylene waxes, and are prepared by emulsifying, at high temperature, a thermally degraded or oxidised and therefore low molecular weight polyethylene (or acrylic—ethylene copolymer) in the presence of surfactants, and then rapidly shock-cooling the emulsion so formed to well below the melting point of the polyethylene. This results in the formation of a stable, clear dispersion of the polyethylene particles. Different molecular weights and copolymer compositions of ethylene may be used to give different softening points of the final coating, and hence different degrees of hardness of the dry polyethylene layer. Also various surfactants may be used, for example anionic or cationic or nonionic.

The polyethylene or ethylene copolymer particles of such an emulsion have a melting point within the range of 100° to 140° C. Thus if as is common the polyethylene which comprises the conductive carbon particles is extruded on to the paper base at about 200°–300° C. then the polyethylene or ethylene copolymer particles will become molten.

The polyethylene emulsion may be applied to the paper base as an aqueous coating and dried before the polyethylene layer is applied thereto or the polyethylene emulsion may be incorporated in the paper during the manufacture of the paper. The polyethylene emulsion used preferably comprises from 20 to 40% by weight of polyethylene particles.

Examples 1 and 2 illustrate this method of the present invention.

According to method 2 of this aspect of the present invention there is provided a method of preparing a laminate which comprises a paper base having coated thereon a layer of polyethylene which comprises conductive carbon particles which method comprises extruding on to a paper base a layer of polyethylene which comprises no conductive carbon particles and the applying to this layer a composition which comprises polyethylene comprising conductive carbon particles the said composition being in the molten state.

In this method of the present invention the layer of polyethylene which is extruded on to the paper base may be free of carbon particles or it may contain a proportion of non-conductive carbon particles.

The layer of polyethylene may be extruded on to the paper base using commercially available methods of extruding polyethylene on to paper base. This extrusion is carried out at an elevated temperature of 300°–320° C.

Example 3 illustrates method 2 of this aspect of the present invention.

According to method 3 of this aspect of the present invention there is provided a method of preparing a laminate which comprises a paper base having coated thereon a layer of polyethylene which comprises conductive carbon particles which method comprises forming a melt of polyethylene particles and from 7 to 10% by weight of carbon black particles of which from 20 to 80% of the total carbon black is conductive carbon and extruding the polyethylene melt on to the paper base at a temperature of from 200° to 370° C. whilst subjecting the surface of the base on to which the polyethylene melt is being applied to a corona discharge treatment.

Preferably in this method the proportion of conductive carbon black particles to ordinary carbon black particles is from 35 to 50% of the total carbon black present.

Preferably in this method the paper on to which the polyethylene melt is being extruded comprises a polyethylene wax of the type used in method 1 of this aspect of the present invention. Alternatively the paper base may comprise a polyethylene layer containing no conductive carbon particles as described in method 2 of this aspect of the present invention.

Preferably the strength of the corona discharge to which the base is subjected during the extrusion of the molten polyethylene is from 0.5 to 10 amps, and most preferably from 2 to 8 amps.

In this method of the present invention when the proportion of conductive carbon is more than 10% of the total weight of the blend, the polyethylene melt can not be readily extruded on to the base. Moreover there is reduced adhesion of the polyethylene melt and the base. Although it is possible to reduce the molecular weight of the polyethylene in order to reduce the melt viscosity and hence enable the blend to be extruded, the resultant melt may frequently be too weak and the melt may break before it can be extruded on to the base.

Examples 4 and 5 which follow illustrate method 3 are hereinbefore set forth.

In the laminate prepared by methods 1 to 3 as hereinbefore set forth if less than 20% of the total carbon black particles are conductive carbon then the surface resistivity of the polyethylene layer approaches $10^{12}$ ohms/m$^2$. Further the charge decay rate is greater than 100 seconds. From 20 to 35% conductive carbon the surface resistivity decreases markedly whilst the charge decay rate is less than 5 seconds. However from 35 to 50% conductive carbon the surface resistivity is less than $10^{10}$ ohms/m$^2$ whilst the charge decay rate drops to less than 1 second.

The roll film assembly of the present invention preferably comprises a paper/polyethylene layer containing conductive particles as prepared by any one of methods 1–3 as hereinbefore set forth. Slittings of these laminates are converted to roll-film backing paper to formats conforming to those described in British Standard BS 1491:1980, or in International Standard ISO 732:1982, or in American National Standard ANSI PHI.21-1972. These slittings are then spooled with a length of photographic silver halide film material of the required length and size. The flange used has flanges of sufficient depth so that when the length of film material and length of backing paper are spooled thereon and the end of the backing paper sealed over itself the assembly is light tight.

The accompanying Examples will serve to illustrate the invention.

Example 1

In this example a preformed film of polyethylene containing conductive carbon was heat laminated to paper base. The paper base chosen was photographic paper base which has a smooth shiny top surface of baryta which is barium sulphate in gelatin and which had been treated with a polyethylene emulsion as hereinafter described. This base was chosen as it was expected that it would be difficult to get a polyethylene layer comprising conductive carbon particles to adhere thereto.

A polyethylene film was prepared by blending together two carbon/polyethylene master batches in equal proportions. One batch comprised 10% by weight of Cabot 1017 a conductive carbon made by the Special Blacks Division of the Cabot Corporation of the U.S.A.

and 90% by weight of low density polyethylene. The second batch comprised 10% by weight of a non-conductive carbon and 90% by weight of low density polyethylene. Thus the blend comprised 5% by weight of non-conductive carbon particles and 5% by weight of conductive carbon particles. This blend was heated to 300° C. to melt it and then it was extruded on to a smooth coating surface to yield a film 30 microns thick.

This polyethylene film had a resistivity of $10^9$ ohms/m$^2$ and a charge decay time of 0.004 seconds to discharge to 80% of its original charge.

The following polyethylene emulsions were used to prepare the laminations. All were obtained from Lakeland Laboratories of the UK.

| Sample Number | Makers Code | Polymer Type | Emulsifier Type | Melting Point °C. |
|---|---|---|---|---|
| (i) | N261 | Ethylene homopolymer | Unknown | 120 |
| (ii) | N392 | Oxidised polyethylene homopolymer | Nonionic | 134 |
| (iii) | N540 | Copolymer of ethylene and acrylic acid | Nonionic | 108 |

Five laminates were prepared. In the case of the controls A and B a piece of the polyethylene film was laminated to a piece of the baryta coated paper by placing them in contact and pressing them between heated iron platens heated to 150° C. except for one corner at which no lamination was performed.

In the case of the other samples the baryta surface of these pieces of the baryta coated paper were coated in a dip trough with the three types of polyethylene emulsion as set forth above. These emulsions were coated as 25% solids aqueous dispersion and dried in an oven at 80° C. A piece of the polyethylene film was then laminated on to each piece of paper using iron platens as with the control except for one corner which no lamination was performed.

The force required to delaminate the polyethylene film from the paper base was then determined, using an Instron tensile tester.

| Sample No. of Polyethylene emulsion | Force required for delamination at constant condition |
|---|---|
| Control A | 5 g |
| Control B | 10 g |
| (i) | No delamination obtainable |
| (ii) | 350 g |
| (iii) | 47 g |

This shows that the method of the invention enables a polyethylene layer containing conductive carbon to be laminated to paper base, with increased adhesion between paper and polyethylene.

Example 2

In this example a-polyethylene melt containing conductive carbon was extruded onto paper which had previously been treated with polyethylene latex (latex (ii) from the previous Example). The latex was applied by a doctor blade and was dried in a current of warm air. The final coating weight of dry latex was 2 g/m$^2$ The paper used was a bleached wood pulp paper of base weight 80 g/m$^2$.

On to the latex treated side of this paper there was extruded a melt of polyethylene containing conductive (2.5%) and non conductive (7.5%) carbon blacks. The extruder was operated at a barrel temperature of 305° C. and a die-jaw zone temperature of 280° C., at a back pressure of 1500 psi.

A corona treatment was applied to the paper surface operating at 2 amps.

The polyethylene/paper laminate from the above experiment was tested for peel strength as in the previous example. When no latex was used, the peel strength was 30 grams but when the latex coating was applied, the peel strength had increased to 65 grams.

Example 3

A conductive melt comprising 5% conductive carbon and 5% non-conductive carbon particles with 80% low density polyethylene was extruded at a die temperature of 230° C. on to paper of density 80g/m$^2$, which had previously had extruded thereon a layer of colourless low density polyethylene. The coating weight of the colourless polyethylene was 7–8 g/m$^2$ and the melt containing conducting carbon particles had a coating weight of 27 g/m$^2$.

The final black polyethylene/paper laminate had surface resistivity $2 \times 10^7$ ohms/m$^2$ and the time to discharge 80% of the initial charge was 0.13 sec. It was not possible to separate the black conductive layer from the colourless polyethylene layer.

A similar coating was prepared in which in place of the colourless polyethylene there was used a black, non-conductive layer comprising 10% of non-conducting carbon particles and 90% low density polyethylene. Again the conducting layer was extruded on top of this and once again it was not possible to separate the two polyethylene layers, or to separate the polyethylene layers from the paper.

The above examples show that the adhesion of polyethylene layers containing conducting particles to paper substrates may be greatly improved by the provision of an intermediate polythene layer either in the form of a polyethylene emulsion or as a pre-coated extruded layer.

Example 4

In this example a polyethylene melt containing conductive carbon was extruded onto paper which had previously been treated with a polyethylene latex. The latex was applied by a doctor blade and was dried in a current of warm air. The final coating weight of dry latex was 2 g/m$^2$. The paper used was a bleached wood pulp paper of base weight 80 g/m$^2$.

On to the latex treated side of this paper there was extruded a melt 1 of polyethylene particles containing conductive (3.5%) and non conductive (6.5%) carbon blacks. The extruder was operated at a barrel temperature of 305° C. and a die jaw zone temperature of 280° C., at a back pressure of 1500 psi.

Melt 2 was also prepared which comprised 2% by weight conductive carbon particles and 8.0% by weight ordinary carbon black particles. The extruder was operated as above.

Melt 3 was also prepared which comprised 8.0% by weight conductive carbon particles and 2.0% by weight ordinary carbon black particles. However in this case it was not possible to extrude the melt on to the paper, even when the extruder conditions were changed.

During the extrusion of melts 1 and 2 on to the paper a corona discharge treatment was applied to the paper surface on to which the melt was being applied at 2 amps.

The thickness of the polyethylene film laminated to the paper using both melts 1 and 2 was 30 microns. In both cases the polyethylene coated had laminated well to the paper.

The surface resistivity of the laminate made according to the present invention using melt 1 was tested and found to be less than $10^{10}$ ohms/m$^2$ and a charge decay time of 0.006 seconds to discharge 80% of its original charge was recorded.

The surface resistivity of the laminate not made according to the present invention using melt 2 was tested and found to be more than $10^{12}$ ohms/m$^2$ and a charge decay time of 500 seconds to discharge 80% of its original charge was recorded.

Example 5

A polyethylene blend was prepared containing 5% by weight of conductive carbon particles and 5% by weight of non-conductive carbon particles. The conductive blend was supplied as a masterbatch with 10% w/w of conductive particles, in low density polyethylene (LDPE), by Cabot Plastics, Dukinfield, Cheshire. The blend was made up to 100% by the addition of a LDPE of melt flow index (MFI) 3.8.

The granules of the above blend were dried in a hot air stream at 80° C. for 60 minutes before charging to the extruder. The extruder was operated under the following conditions:

| Extruder Zone | Temperature, C. |
|---|---|
| Barrel | 250–280° |
| Adapter | 275° |
| Stem Pipe | 260° |
| Die | 230° |
| Die Jaw | 230° |

The screw speed was 75 rpm. The blend was extruded at a back pressure of 1350 psi on to a paper base of 80 g/m$^2$ density. The web speed was 85 feet/minute and the corona treatment level 3 Amps. There was obtained a polyethylene/paper laminate of excellent coating quality and free from pinholes, with a coating weight of polyethylene of 30±2 g/m$^2$.

A control was prepared in the same way, except that no conductive particles were used in the blend. Thus a LDPE melt containing 10% non-conducting carbon black by weight was extruded using similar conditions to those above, to give a black polyethylene-laminated paper with a coating weight of 32±2 g/m$^2$.

EXAMPLE 6

The laminates prepared in Examples 1–5 were converted into roll film backing paper to conform with BS 1491:1980. These slittings were spooled with a requisite length of silver halide photographic material which comprised a suitable subbed cellulose triacetate base coated with a silver halide emulsion layer.

Samples of roll film assemblies comprising a paper/polyethylene containing conductive carbon particles as prepared in Examples 1–5 were subjected to the following tests.

Samples of the roll films were exposed for 10 minutes to a bright light whilst in the rolled form. Each sample was then developed in a photographic developing solution and it was found that none of the films had been fogged.

These spools then were subjected to measurements of surface resistivity and charge decay time. The measurement of surface resistivity was carried out with an EIL Megohmeter using 5 cm electrodes separated by 1 cm. The charge decay measurements were made by using a John Chubb Charge Decay instrument by applying an initial charging voltage of 6KV. Additionally the film and backing paper components of the assembly were separated mechanically at a controlled rate of 10 m/minute and the charge generated on each surface monitored by a Monroe Field Probe (model 1019B-4) attached to a Monroe Field Meter (model 245).

| SAMPLE | SURFACE RESISTIVITY (BLACK SIDE) | CHARGE DECAY TIME (BLACK SIDE) Sec to 1/e | SEPARATION CHARGE KV/cm | |
|---|---|---|---|---|
| | | | on Film | on Paper |
| Control | $3 \times 10^{12}$ | 625 | 1.5–3.1 | −0.2 to −0.3 |
| Invention (all 5 samples) | $2 \times 10^7$ | 0.0 | 0.3 | 0.0 |

The figures above show that the inclusion of conductive carbon particles not only markedly enhances the rate of charge dissipation from the paper surface, but also produces a major decrease in the magnitude of the separation charge which can build up during the separation of the film from the backing paper. This in turn considerably reduces the risk of electrostatic discharge and thereby prevents the generation of static marks on the developed film.

We claim:

1. A method of preparing an antistatic roll film backing paper for photographic roll film, comprising:
    applying a polyethylene layer to a paper substrate;
    applying an opaquing layer to said polyethylene layer at a temperature sufficient to melt the polyethylene, said opaquing layer comprising polyethylene and from about 7 to 10% by weight of a mixture of conductive and non-conductive carbon black particles, said mixture containing from 20 to 80% by weight of conductive carbon black particles.

2. The method of claim 1 wherein said mixture contains from 30 to 80% by weight of conductive carbon black particles.

3. The method of claim 2 wherein said mixture contains about 70% by weight of conductive carbon black particles.

4. The method of claim 1 wherein said polyethylene layer applied to said paper is free of carbon black particles.

5. The method of claim 1 wherein said polyethylene layer is applied to said paper substrate as a latex emulsion.

6. The method of claim 5 wherein said polyethylene latex emulsion is a polyethylene copolymer latex emulsion.

7. The method of claim 5 wherein said latex emulsion layer is applied to the substrate as an aqueous coating which is dried prior to application of said opaquing layer.

8. The method of claim 1 wherein said polyethylene layer is extruded onto said paper substrate.

9. The method of claim 8 wherein the polyethylene layer is extruded onto the paper substrate at a temperature of between 300° and 320° C.

* * * * *